United States Patent Office 3,479,800
Patented Nov. 25, 1969

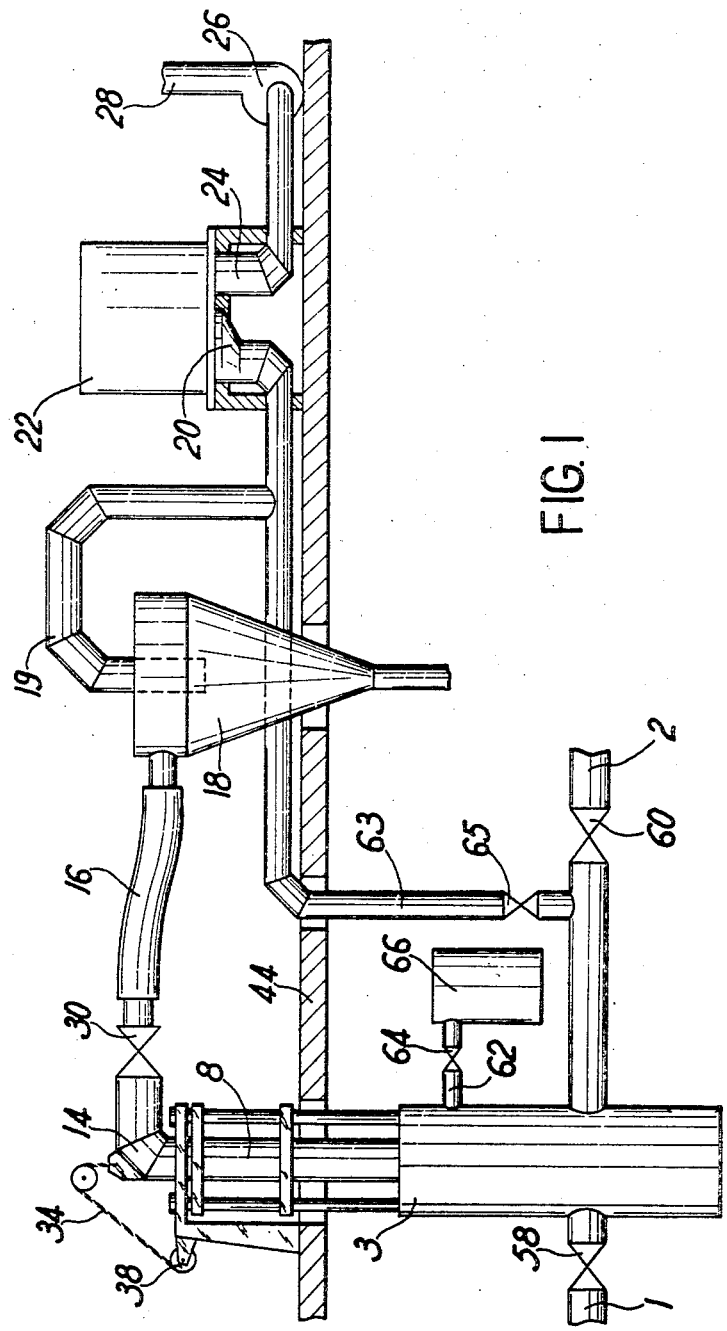

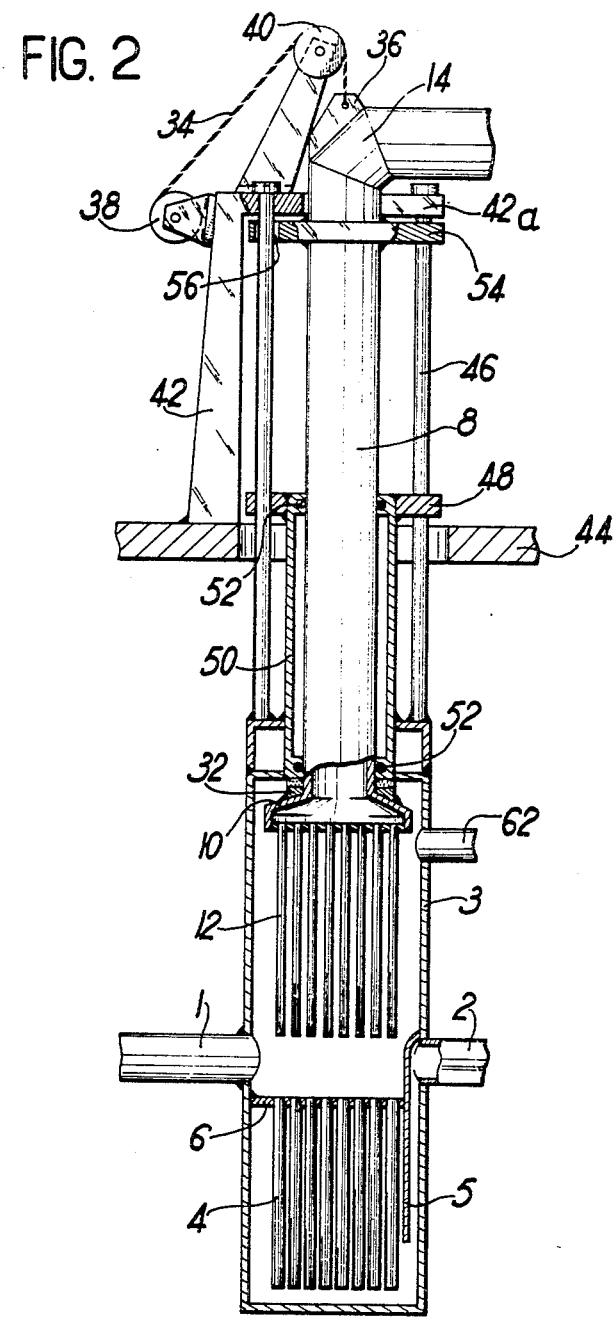

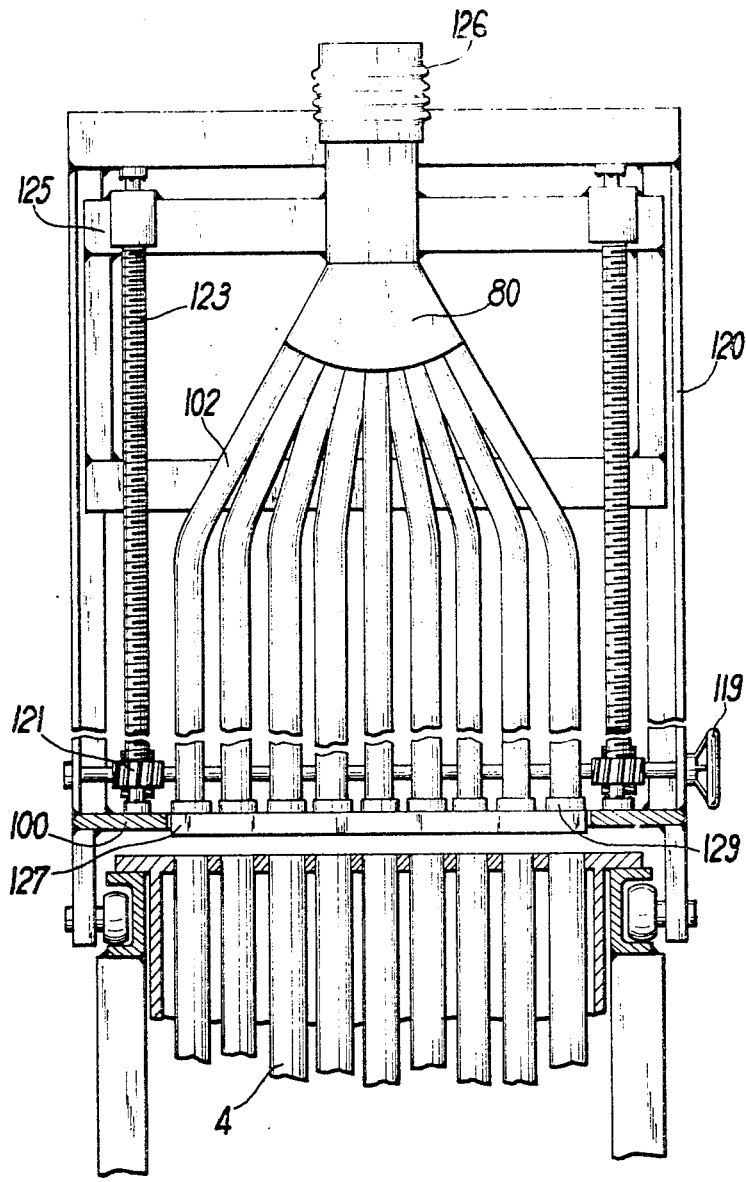

3,479,800
GAS FILTERING INSTALLATION
Jacques Brion, Jouy-en-Josas, Michel Cousin, Montrouge, Wulf Talejkinski, Paris, and Andre Volk, Eaubonne, France, assignors to Commissariat a l'Energie Atomique, Paris, France
Filed July 24, 1967, Ser. No. 655,526
Claims priority, application France, Aug. 9, 1966, 72,566
Int. Cl. B01d 45/18, 46/04
U.S. Cl. 55—294                    10 Claims

ABSTRACT OF THE DISCLOSURE

A filtering installation which provides, without dismounting and consecutively, gas filtering through porous tubes which are preferably lined with a fibrous deposit, then the cleaning of the tubes when clogged by deposit of substances carried along by the filtered gas, and regeneration of the tubes, prior to further filtering, by the spraying of fibrous material onto their inner wall. These features are obtained by providing the installation above the actual filter with a number of tubular cleaning probes which can move relatively to the porous tubes and which can penetrate inside each such tube and which are connected to a suction system. A unit for spraying fibrous material into the cleaned tubes is also provided.

---

This invention relates to a filtering installation comprising filter elements in the form of porous tubes disposed in a casing having an entry and an exit for the fluid being processed.

Filters of this kind are usually satisfactory and effectively stop the dust carried along by the gas to be filtered; unfortunately, the filters gradually become clogged by the deposits of dust and, if they are to remain efficient, must be periodically cleaned. Accordingly, the filters are dismounted and taken to a special installation—a lengthy and fairly complex operation and one which gives rise to serious problems in cases in which the gases to be filtered convey radioactive particles. Bell housings and other protective means are then required during the dismounting and transportation and the filters must be cleaned in a hermetic enclosure.

It is an object of this invention to obviate these disadvantages and to enable the filters to be cleaned in situ without dismounting and transportation.

According to the invention there is provided an installation for filtering gas comprising a casing, porous filtering tubes disposed in side-by-side relationship in said casing, a supply line in said casing for said gas and communicating with the interior of said tubes, and an exit line for the gas from the casing communicating with the outside of the tubes, characterized in that the installation includes a number of tubular probes located above the filtered tubes, said probes being rigidly interconnected and connected to a suction system, means for moving the probes between a withdrawn position above the tubes during filtering and a position in the tubes for sucking deposits away from the inner walls of the tubes, a unit for spraying a fibrous lining in the porous tubes which have been cleaned and stripped of their lining by said probes, and means for connecting the spraying unit to the tube entries.

An installation of this kind is therefore very suitable for filtering hot gases including the smoke from waste incinerators, since not only can it provide rapid and completely safe cleaning of the filters whenever necessary but also it can use filter elements in the form of porous tubes lined with a fibrous deposit, filter elements of this kind being able to withstand heat very well. The spraying unit can therefore be used to line the filter elements after use and after each cleaning, again without any dismounting.

The invention will now be described by way of example with reference to the accompanying drawings in which:

FIG. 1 is a complete side elevation of a filtering installation in accordance with the invention;

FIG. 2 is a view in axial section and to an enlarged scale of the filter and of the suction probes;

FIG. 8 is a sectioned view to an enlarged scale of an alternative form of suction unit.

Figure 9:
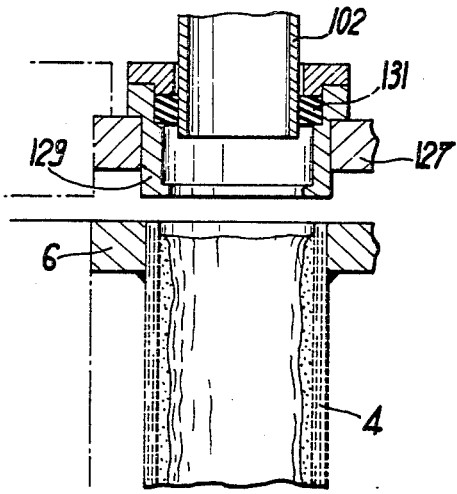
FIG. 9 is a view in section but to an enlarged scale, of the element for guiding the probes of the apparatus shown in FIG. 8.

The filtering installation as shown in FIGURE 1, is mounted between a line 1 for the supply of a gas for filtering, e.g. the smoke exit of an incinerator (not shown) and a line 2 for removing the filtered gas. As can be seen in FIGS. 1 and 2, the two lines 1, 2 open into a casing 3 which extends around filter elements 4 on either side of a vertical partition 5 but above a plate 6 bearing the elements 4. The filter elements 4 are in the form of porous tubes which are closed at the end remote from the plate 6 and which provide communication between the lines 1 and 2 so as to enable gas to flow from one to the other but which stop the dust contained in the gas, the gas flow causing the dust to stick to the walls of the elements 4.

Extending through the top of casing 3 is a rigid tube 8 which terminates in casing 3 in a nozzle 10 bearing a number of tubular probes 12 which are equal in number to the filter elements 4 and coaxial thereof. The tube 8 extends outside casing 3 by an elbow 14 which is connected by a flexible pipe 16 to the input of a cyclone separator 18 communicating at the bottom with a dust collector (not shown). A line 19 extends from the top of the separator 18 to the entry 20 of an air filter 22 whose exit communicates with an extractor fan 26 discharging through an exhaust line 28.

Communication between the suction apparatus formed by the fan 26, filler 22 and cyclone 18 with the probes 12 is controlled by a valve 30 between the elbow 14 and pipe 16. When the probes 12 are in the raised position in the top storage part of the casing 3 as shown in FIGURE 2, the nozzle 10 bears on a ring gasket 32 which provides a seal between the tube 8 and the casing 3, the tube 8 being retained in position by a cable 34 which is secured to a lug 36 rigidly secured to the elbow 14 and which is wound around a drive winch 38, a guide pulley 40 being interposed between winch 38 and lug 36. The winch 38 and the pulley 40 are disposed on gallows 42 mounted on a stationary platform 44 which is disposed above the filter and through which the tube 8 and the various drive members extend.

The gallows 42 form parallel to platform 44 a stirrup 42a through whose centre the tube 8 extends. Casing 3 is suspended on stirrup 42a by means of three rigid rods 46 fixedly secured to the top of casing 3 and also to end flange 48 of a sleeve 50 which serves to guide the vertical movement of the tube 8 and which is secured at its other end to the casing 3, ring gaskets 52 providing sealing-tightness when the tube 8 moves. Preferably, sleeve 50 is formed with orifices (not shown) for the entry and exit of a cooling fluid.

Below the elbow 14 the tube 8 has a collar 54 provided with holes 56 enabling it to slide freely along the rods 46; and the length of sleeve 50—i.e., the position of flange 48—is such that, when the probes 12 have penetrated far enough into the tubes 4 to clean the same satisfactorily, collar 54 abuts flange 48 to stop the descent of tube 8.

It will be appreciated that, when the filter elements 4 have become clogged, a simple operation of the winch 38 followed by the opening of the valve 30 is enough to produce first the descent of the probes 12 into the elements 4, then the removal by suction, via the probes 12, pipes 16, line 19 and filter 22, of the dust and other deposits in the elements 4. Upon the completion of this operation the valve 30 is reclosed, whereafter the winch 38 is operated again to raise the tube 8 and the probes 12 to their storage position in the top part of the casing 3 as shown in FIG. 2. Valves 58, 60, via which the filter communicates with the incinerator and with the exhaust line, respectively, can be reopened and filtering restarted.

Preferably, however, the casing 3 has above the plate 6 a second line 62 controlled by a valve 64 and connected to a spraying unit 66 which comprises a stock of fibrous material and a spray device such as a spray gun or flake sprayer, is used to line the porous tubes of the filter element 4, before filtering, with a fibrous deposit, such as asbestos, to improve tube efficiency and high-temperature behaviour. The used fibres are then sucked away together with the dust, so that they can be renewed and so that the filter after lining is regenerated as well as clean. The air used for spraying can return to filter 22 via a line 63 controlled by a valve 65.

Figure 3:
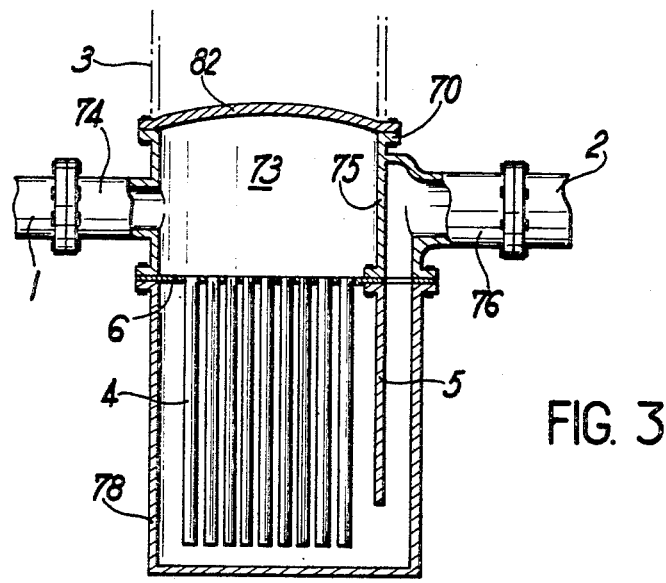
FIG. 3 shows an alternative form of filter.

In some cases, however, it may be convenient to use releasable readily interchangeable filters which can be replaced either after wear or by a filter more suitable to the particular gas being filtered. In this event, the casing 3 is limited just to the storage zone for the probes 12 and is open at the bottom. The gas entry and exit lines 1, 2 are positioned as previously but, as can be seen in FIG. 3, are connected below the casing 3 to lines 74 and 76 connected with a distributor box 73 which is secured to a enclosure 78 and which has a partition 75 for isolating the lines 74, 76, the partition 75 being an extension of the inner partition 5 of the enclosure 78. Before being fitted to casing 3, box 73 is closed by a releasable cover 82 which can be withdrawn readily and replaced by the casing 3, to which end the latter has a flange for securing to flange 70 of box 73, the installation then operating as in the case shown in FIG. 2.

The filter elements 4 can be sprayed with a fibrous material before filtering through line 62, whereafter the probes 12 clean and even remove the lining from the porous tubes of the elements 4. After use, or if it is required to replace the filter by a filter having different properties, the enclosure 78 is separated from the box 73 and is closed by a cover or by a plastic cloth, whereafter the filter is raised and conveyed away.

Figure 4:
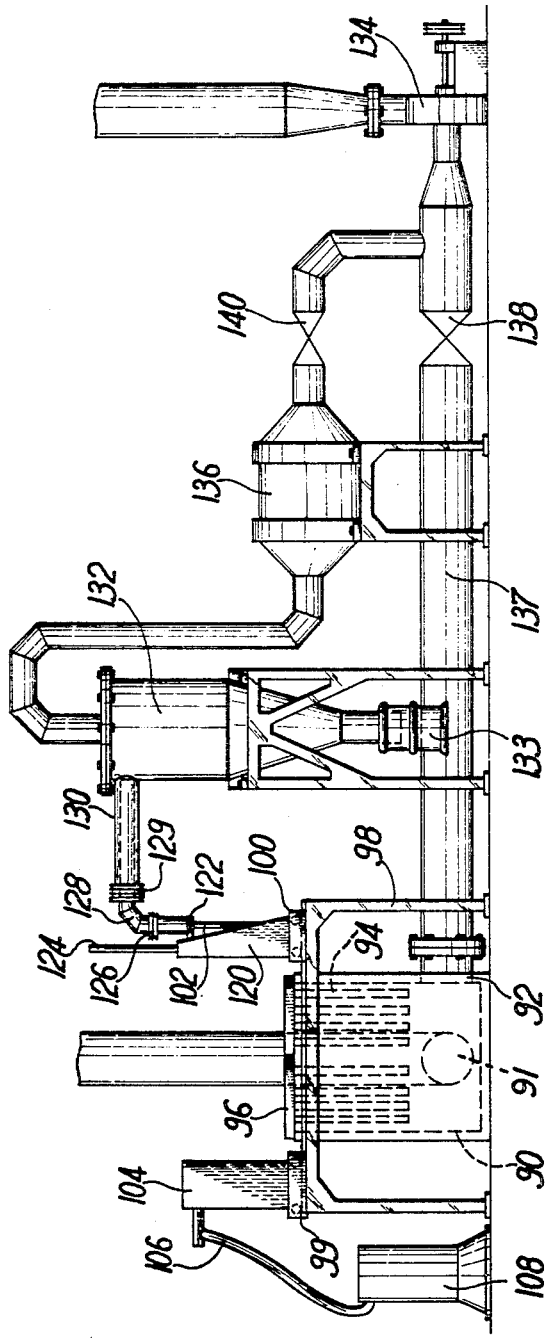
FIG. 4 is a complete view of an alternative form of filtering installation in accordance with the invention.

In cases in which there is a very high rate of flow of gas requiring filtering and a large number of filter elements must be available, and activity is not excessive, for instance, in cases in which the installation is required to filter the smoke from a waste incinerator, the bulk of a casing comprising one probe per filter element can be avoided if the probes are fitted to a moving system above the elements, the latter then being cleaned consecutively in groups. As FIG. 4 shows, the filter comprises a number of rows of filter elements 94 which are disposed in a single casing 90 having at the bottom a side entry 91 and side exit 92 for the gas. Preferably, the filter elements 94 are disposed in pairs or in a number of groups and the casing has only one or more covers 96 each closing the access to one of the groups.

Figure 5:
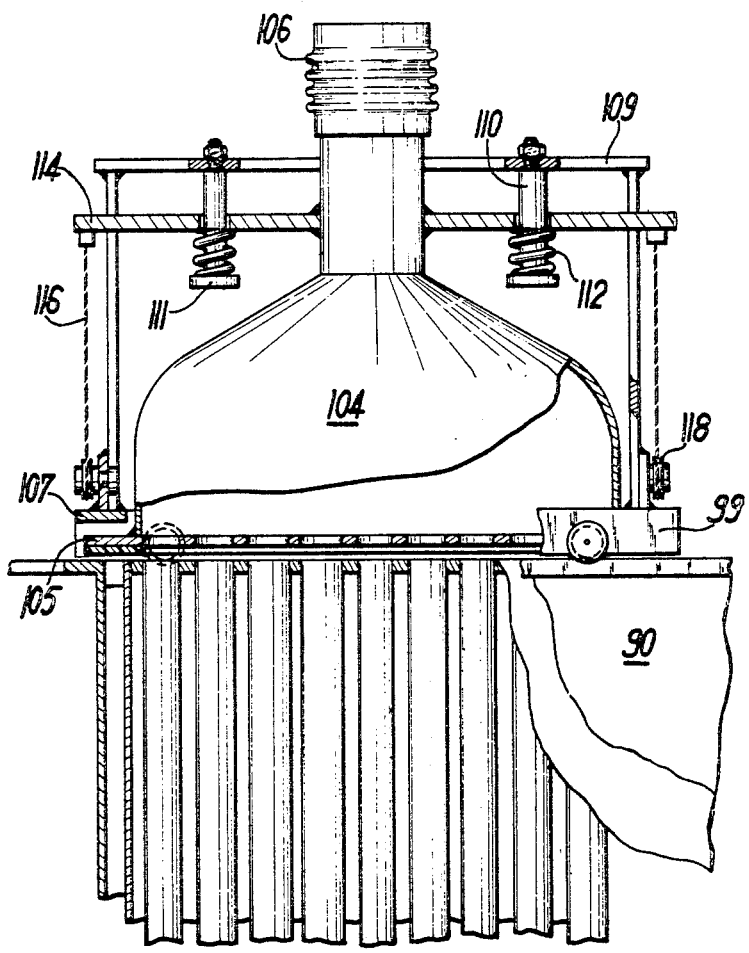
FIG. 5 is a sectioned view to an enlarged scale of the spraying chamber.

Around the casing 90 a frame 98 bears two parallel rails each disposed on one side of the casing along the top part thereof. The rails extend either side of the filter and serve to guide two moving carriages 99, 100, one of which bears suction probes 102 and the other of which bears a spraying chamber 104. The chamber 104 is connected by a flexible pipe 106 to a stationary spraying unit 108 and, as can be seen in FIG. 5, preferably resembles in shape an inverted rectangular-cross-section funnel having a flange 105 adapted to move vertically in a rectangular ring 108 which forms the base of the carriage 99 and bears the wheels thereof. Ring 107 also bears a frame 109 to which two rods 110 are secured on either side of the pipe 106, the rods terminating in a head 111 on which a spring 112 bears. The two springs 112 bear a crosspiece 114 which can slide freely on the rods 110 but which is rigidly secured to the funnel 104. Extending through each end of crosspiece 114 is a cable 116 which winds around a winch 118 having a horizontal spindle borne by ring 107. A drive element (not shown) is adapted to rotate the winches 118 so as to move the crosspiece 114 and ring 107 towards one another and therefore to clamp the chamber 104 to the casing 90, the same being raised by the springs 112 immediately the cables slacken.

On the other side of the casing 90, the second carriage 100 has a frame 120 bearing a vertical rod (not visible in the drawings) for guiding the sliding movements of a plate 122 rigidly secured to the probes 102, a pneumatic actuator 124 adapted to produce the sliding movement of plate 122 also being mounted on frame 120. The probes 102 are provided to a number corresponding to the number of elements of any single row in the filter and are arranged in a single line. They are connected by a flexible sleeve 126 to a rigid elbow 128 which is connected by a second flexible sleeve 129 to a telescopic tube 130 communicating with a cyclone separator 132. The suction circuit is completed by a fan 134 connected to the output of an air filter 136 supplied with the gases leaving the cyclone 132.

In a modification shown in FIGS. 8 and 9, the carriage 100 bears on each side of a frame 120 a helical gear wheel 121 which can be driven by any appropriate means, such as a hand wheel 119, and which meshes with a worm 123 for producing vertical movement of a moving frame 125 bearing the row of probes 102. At the bottom of the carriage 100, the probes 102 are guided by a plate 127 pierced with a row of holes in each of which a guide ring 129, visible in FIG. 9, bears a cleaning ring 131, e.g. of felt, in intimate contact with the probe. When the probe moves, the cleaning ring 131 wipes the outer surface of the probe; consequently, the ring 131 prevents any dust from entering the filter during descent and, more particularly during reascent, it holds back the contaminated dust which has been sucked away and deposited on the probe outer walls.

The probes 102 are also connected to a collector 80 secured to the sleeve 126 and specially devised to ensure that the isokineticism of the air stream lines is retained inside the probes, to ensure that the material which is being sucked away is not deposited.

Figure 6:
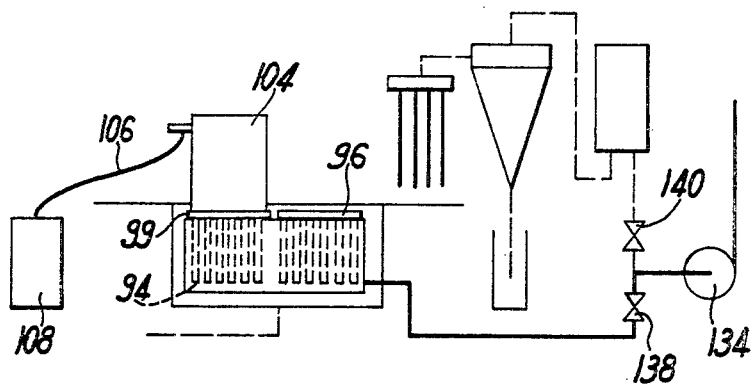
FIGS. 6 and 7 are diagrammatic views of the installation shown in FIG. 5, the same being in the position for lining in FIG. 6 and in the position for dust removal in FIG. 7.
Figure 7:
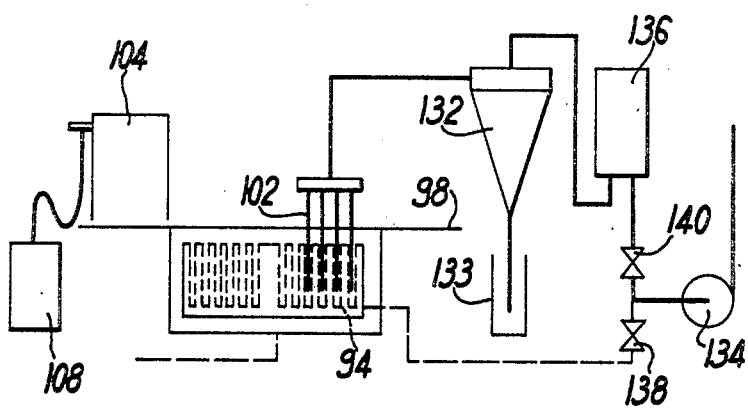

The filter exit 92 is also connected to extractor fan 134 via a line 137 having a stop valve 138, and another valve 140 is provided between filter 136 and fan 134. During filtering valve 140 is closed and valve 138 is open. The spraying and cleaning units are in the position shown in FIG. 4—i.e., withdrawn to the ends of the frame 98, with the covers 96 closing the casing 90 hermetically. The smoke arriving through line 91 goes through the filter elements, departs therefrom via the exit 92 and goes through line 137 before being exhausted by fan 134. On the completion of filtering the covers 96 are removed and the carriage 100 is shifted to bring the probes 102 above a first series of filter elements 94 (FIG. 7), then to lower the probes into such elements. Valve 140 is open and valve 138 is closed and fan 134 sucks the dust deposits from the filters. The dust deposits go to the cyclone 132 where the heavier ingredients drop into a collector 133, whereas the lighter ingredients are carried to a filter 136 which retains them, only filtered air being discharged beyond the fan 134. When the elements 94 being treated have been cleaned satisfactorily, the probes are raised and the carriage 100 is shifted to another series of elements. The complete filter is dealt with in this way, the deposits being removed consecutively from the various elements. Also, the fibrous filter lining is stripped from the filter elements. The stripping carriage is then withdrawn to the end of frame 98, and the spraying carriage 99 is brought above the first part of the filter, as shown in FIG. 6, the other part being covered by its cover 96. The fibrous lining material is sent by the device 108 to the chamber 104, which acts as a homogenisation chamber, while the fan 134, which the opening of the valve 138 has connected to line 137, sucks away the fibre-laden air. The fibres gradually deposit on the porous tube and re-form the filter element 94. The chamber 104 is then raised, the cover 96 is replaced, and the carriage 99 is moved to the other part of the filter whose cover has been removed. Another spraying operation is performed, whereafter the carriage 99 is in turn withdrawn to the end of frame 98, the second cover 96 is secured to the filter, and the installation is ready for further operation.

Carriage movements can be on any appropriate basis, for instance, by means of a toothed rack which is rigidly secured to the frame 98 and which meshes with a gear wheel disposed on the carriage and driven by a remotely started drive system. The resulting filtering installation, as well as enabling the filter elements to be cleaned without demounting and complex operations, makes it possible to use filters which have a deposit of fibrous material and which are very well suited to hot filtering operations, with the further possibility of lining and stripping the filters whenever required without demounting or shifting them.

We claim:
1. An installation for filtering gas comprising a casing, porous filtering tubes having open upper inlet ends disposed in side-by-side relationship in said casing, a supply line in said casing for said gas and communicating with the interior of said tubes, and an exit line for the gas from the casing communicating with the outside of the tubes, a plurality of tubular probes located above the filtering tubes, said probes being rigidly interconnected to a rigid tubular collector, a flexible tube connecting the collector to a suction system, means for moving the probes between a withdrawn position above the tubes during filtering and a position in the tubes for sucking deposits away from the inner walls of the tubes, a unit for spraying a fibrous lining in the porous tubes which have been cleaned and stripped of their lining by said probes, and means providing communication between the spraying unit and the tube inlets.

2. An installation as set forth in claim 1 including means for guiding the vertical movement of the probes.

3. An installation as set forth in claim 1, the collector bearing the probes being rigidly secured to a plate slidable on at least one stationary rod between two movement-limiting abutments.

4. An installation as set forth in claim 1 including a chamber extending from the filter casing and forming with the filter a hermetic enclosure for storing the probes in the inoperative position.

5. An installation as set forth in claim 4, the casing of the filter being releasably connected to the storage chamber through a distribution box having the gas entry and exit orifices.

6. An installation as set forth in claim 4, the spraying unit extending into the storage chamber and isolated by a valve disposed above the filter tubes.

7. An installation as set forth in claim 1, the spraying unit comprising a chamber, means for moving the chamber relatively to the filtering tubes, and means for clamping said chamber hermetically to the filtering tubes.

8. An installation as set forth in claim 1, the number of suction probes being less than the number of porous filter tubes, said means for moving the probes moving the probes vertically and horizontally for consecutive introduction into tube groups each containing the same number of tubes.

9. An installation as set forth in claim 8, said means for moving the spraying chamber and the suction probes including two carriages moving the spraying chamber and the suction probes vertically and then horizontally at the top of the casing, the top of the casing being closed by at least one releasable cover.

10. An installation as set forth in claim 1 the suction unit comprising a dust separator cyclone, an air filter and an extractor fan.

References Cited

UNITED STATES PATENTS

| 1,944,267 | 1/1934 | Rathbun | 55—294 |
| 1,944,268 | 1/1934 | Rathbun | 55—294 |
| 3,041,808 | 7/1962 | Snyder | 55—524 |

HARRY B. THORNTON, Primary Examiner

U.S. Cl. X.R.

55—302, 315, 524